(12) United States Patent
Toduka et al.

(10) Patent No.: US 9,735,409 B2
(45) Date of Patent: Aug. 15, 2017

(54) LEAD ACID BATTERY

(75) Inventors: Masatoshi Toduka, Tokyo (JP); Masanori Sakai, Tokyo (JP); Shinsuke Kobayashi, Tokyo (JP); Koji Kogure, Tokyo (JP); Satoshi Minoura, Tokyo (JP); Toshio Shibahara, Tokyo (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 160 days.

(21) Appl. No.: 14/117,106

(22) PCT Filed: Feb. 28, 2012

(86) PCT No.: PCT/JP2012/054943
§ 371 (c)(1),
(2), (4) Date: Nov. 12, 2013

(87) PCT Pub. No.: WO2012/157311
PCT Pub. Date: Nov. 22, 2012

(65) Prior Publication Data
US 2015/0050540 A1 Feb. 19, 2015

(30) Foreign Application Priority Data

May 13, 2011 (JP) .................. 2011-108690
Aug. 30, 2011 (JP) .................. 2011-187384

(51) Int. Cl.
*H01M 2/16* (2006.01)
*H01M 4/14* (2006.01)
(Continued)

(52) U.S. Cl.
CPC .......... *H01M 2/162* (2013.01); *H01M 2/1606* (2013.01); *H01M 4/14* (2013.01);
(Continued)

(58) Field of Classification Search
CPC .... H01M 2/162; H01M 2/16066; H01M 4/14; H01M 4/621; H01M 4/685; H01M 10/06; H01M 10/128; H01M 10/4235
See application file for complete search history.

(56) References Cited

U.S. PATENT DOCUMENTS

2009/0148760 A1 6/2009 Justice

FOREIGN PATENT DOCUMENTS

| CN | 101919088 A | 12/2010 |
|---|---|---|
| JP | 8-45537 A | 2/1995 |

(Continued)

OTHER PUBLICATIONS

Office Action of Chinese Appln. No. 201280023755.2 dated Jul. 13, 2015 with English translation.

*Primary Examiner* — Helen O Conley
(74) *Attorney, Agent, or Firm* — Fitch, Even, Tabin & Flannery LLP (57) ABSTRACT

On each negative plate (1), a non-woven fabric (2) composed of fibers of at least one material selected from a group of materials comprising glass, pulp and polyolefins comes into contact with the entire surface of the plate without being integrated with the plate. Each negative plate (1), which is in contact with the non-woven fabric (2), is contained in an envelope separator (3) comprising a microporous synthetic resin sheet, and is laminated with a positive plate (4). The non-woven fabric is manufactured through papermaking process in which glass fibers, pulp and silica powder are preferably used and dispersed in water as the main components.

13 Claims, 1 Drawing Sheet

(51) Int. Cl.
*H01M 4/62* (2006.01)
*H01M 4/68* (2006.01)
*H01M 10/06* (2006.01)
*H01M 10/12* (2006.01)
*H01M 10/42* (2006.01)

(52) U.S. Cl.
CPC ........... *H01M 4/621* (2013.01); *H01M 4/685* (2013.01); *H01M 10/06* (2013.01); *H01M 10/128* (2013.01); *H01M 10/4235* (2013.01); *H01M 2220/20* (2013.01); *H01M 2300/0011* (2013.01); *Y02E 60/126* (2013.01)

(56) References Cited

FOREIGN PATENT DOCUMENTS

| | | | |
|---|---|---|---|
| JP | 7-176300 | A | 7/1995 |
| JP | 9-17406 | A | 1/1997 |
| JP | 11-250913 | A | 9/1999 |
| JP | 2002-25602 | A | 1/2002 |
| JP | 2002-141066 | A | 5/2002 |
| JP | 2002-231247 | A | 8/2002 |
| JP | 2004-63152 | A | 2/2004 |
| JP | 2005-285700 | A | 10/2005 |
| JP | 2005-327546 | A | 11/2005 |
| JP | 2006-59576 | A | 3/2006 |
| JP | 2006-86039 | A | 3/2006 |
| JP | 2008-098009 | A | 4/2008 |
| JP | 2008-243487 | A | 10/2008 |
| WO | 2005/124920 | A1 | 12/2005 |
| WO | 2009076401 | A1 | 6/2009 |

LEAD ACID BATTERY

TECHNICAL FIELD

The present invention relates to a flooded-type lead acid battery including electrolyte free from a plate group and a separator in a battery container.

BACKGROUND ART

In these years, in automobiles, various measures are studied to improve fuel consumption in order to prevent atmospheric pollution and global warming. For automobiles to which measures to improve fuel consumption are applied, such vehicles are studied including idling-stop system vehicles (in the following, referred to as ISS vehicles) in which the operation time of the engine is reduced, and micro hybrid vehicles such as a generation control vehicle in which the rotation of the engine is used for power with no waste.

In the ISS vehicle, the number of times to start the engine is increased, and large current discharge is repeated in a lead acid battery every time when the engine is started. Moreover, in the ISS vehicle and the generation control vehicle, since the power output from an alternator is reduced and a lead acid battery is charged intermittently, the lead acid battery is often insufficiently charged.

The lead acid battery used in the manner described above is used in a partially charged state called the PSOC (Partial State Of Charge). When the lead acid battery is used under the PSOC, the lifetime of the lead acid battery is prone to be shorter than in the case where the lead acid battery is used in the full charge state. It is considered that the reason why the lifetime is shortened when the lead acid battery is used under the PSOC is that when charging and discharging is repeated in the state in which charge is short, lead sulfate generated on a negative plate in discharging becomes coarse and the lead sulfate is hard to return to metal lead which is charge product.

Moreover, in charging, sulfuric acid ions are generated from lead sulfate which is discharge product, and sulfuric acid ions are heavy. Thus, sulfuric acid ions tend to move below in electrolyte. In the typical use of the lead acid battery, the electrolyte is stirred due to gassing in the end of charging, and it is suppressed that sulfuric acid ions are moved below. However, since the battery is not fully charged under the PSOC, the electrolyte is hardly stirred due to gassing. As a result, concentrated electrolyte resides in the lower part of a battery container, dilute electrolyte resides in the upper part of the battery container, and layers are formed in the electrolyte. It is difficult to accept charging (it is difficult to advance a charging reaction) under the concentrated electrolyte, and the lifetime of the lead acid battery is shortened.

Schemes for suppressing the formation of layers in the electrolyte are disclosed in Patent Literature 1 (Japanese Patent Application Laid-Open Publication No. 2002-025602), Patent Literature 2 (Japanese Patent Application Laid-Open Publication No. 2004-063152), and Patent Literature 3 (Japanese Patent Application Laid-Open Publication No. 2006-059576).

Patent Literature 1 discloses a lead acid battery including a plate group in which an expanded grid positive plate accommodated in a synthetic resin envelope separator and an expanded grid negative plate having a glass fiber mat attached to its surface, are alternately stacked. In Patent Literature 1, a problem is described in paragraph 0003 that hydrogen gas generated from the negative plate surface does not sufficiently contribute to stirring electrolyte and the electrolyte is prone to form layers in the electrolyte. Patent Literature 1 is directed to a lead acid battery that is charged to fully charged state in which hydrogen gas is generated from the negative plate surface.

Patent Literature 2 discloses a lead acid battery including a plate group in which a positive plate, a negative plate entirely covered with an envelope separator, and a planar separator with a glass mat that are laminated in multiple layers as the planar separator is disposed between the positive and negative plates (FIG. 5 (C)). It is noted that as described in paragraph 0007 in Patent Literature 2, it is recognized in the invention that the diffusion of electrolyte between the positive plate and the negative plate is hampered due to the structure of the envelope separator, causing the formation of layers in the electrolyte depending on concentrated electrolyte in the lower part of the plate and dilute electrolyte in the upper part of the plate during use. Patent Literature 2 does not solve the prevention of forming layers in the electrolyte.

Patent Literature 3 discloses a flooded-type lead acid battery separator formed of a microporous sheet bonded to a glass mat with some adhesive in order that layers are not prone to be formed in electrolyte even under the environment in which it is difficult to stir and circulate the electrolyte. However, the invention described in Patent Literature 3 does not disclose how to use the separator in the relationship between a positive plate and a negative plate.

Moreover, Patent Literature 4 (Japanese Patent Application Laid-Open Publication No. Hei-08-045537) discloses a configuration in which a U-shaped glass mat is disposed between a positive plate and an envelope separator made of a microporous synthetic resin film enveloping the positive plate in order to prevent a short circuit due to grid deformation caused due to a corroded positive electrode grid.

CITATION LIST

Patent Literature

Patent LITERATURE 1: Japanese Patent Application Laid-Open Publication No. 2002-025602
Patent LITERATURE 2: Japanese Patent Application Laid-Open Publication No. 2004-063152
Patent LITERATURE 3: Japanese Patent Application Laid-Open Publication No. 2006-059576
Patent LITERATURE 4: Japanese Patent Application Laid-Open Publication No. Hei-08-045537

SUMMARY OF THE INVENTION

Technical Problem

It is an object of the present invention to suppress the formation of layers in electrolyte and improve battery lifetime performance in a flooded-type lead acid battery that is discharged to a load in partially charged state even in the case where it is difficult to stir electrolyte due to gassing because the battery is not fully charged under the PSOC.

Solution to Problem

The present invention is directed to a flooded-type lead acid battery including a plate group including: a negative plate having negative active material filled in a negative electrode current collector; and a positive plate having positive active material filled in a positive electrode current collector. The negative plate and the positive plate are stacked on each other through a separator and accommodated in a battery container together with electrolyte. The flooded-type lead acid battery is intermittently charged, and is highly efficiently discharged to a load in partially charged state.

In the present invention, the negative plate is contacted with a nonwoven fabric throughout the plate surface, not integrated with the plate, and the negative plate contacted with the nonwoven fabric is accommodated in an envelope separator made of a microporous synthetic resin sheet. Here, the nonwoven fabric is formed of at least one fiber material selected from a material group consisting of glass, pulp, and polyolefin.

The nonwoven fabric is a mixed nonwoven fabric including glass fiber, pulp, and inorganic oxide powder as a principal component. Preferably, the inorganic oxide powder is silica powder.

Moreover, preferably, the nonwoven fabric is bent so that surfaces are opposite to each other, and the negative plate is disposed between the opposite surfaces.

Advantageous Effects of Invention

According to the present invention, a highly porous separator formed of a nonwoven fabric is contacted with the surface of the negative plate, so that the precipitation of sulfuric acid ions dissolved from lead sulfate in charging can be prevented. Accordingly, the occurrence of layer formation of electrolyte can be prevented. As a result, it is possible to improve a poorly charged state under the PSOC and to obtain a lead acid battery of a long lifetime.

DESCRIPTION OF EMBODIMENTS

A lead acid battery according to the present invention is a flooded-type lead acid battery that is intermittently charged and is discharged to a load under the PSOC, and the lead acid battery is preferable for use in micro hybrid vehicles such as an ISS vehicle. The lead acid battery according to the present invention has a configuration in which a plate group includes a negative plate having negative active material filled in a negative electrode current collector and a positive plate having positive active material filled in a positive electrode current collector, and the negative plate and the positive plate are stacked on each other through a separator and accommodated in a battery container together with electrolyte. These basic configurations are similar to the basic configurations of previously existing lead acid batteries.

In implementing the present invention, some carbon conductive material and some organic compound are added to the negative active material. The organic compound is added in order to suppress the formation of coarse negative active materials accompanied by charging and discharging.

Preferably, the carbon conductive material is selected from a material group consisting of graphite, carbon black, activated carbon, carbon fiber, and carbon nanotube. Preferably, the quantity of addition of the carbon conductive material ranges from 0.1 to 3 parts by mass with respect to 100 parts by mass of the negative active material (spongiform metal lead) in the fully charged state. Preferably, graphite is selected, and more preferably, flake graphite is selected. Preferably, the average primary particle size of flake graphite is 100 μm or more.

Flake graphite referred here is flake graphite described in JIS M8601 (2005). The electric resistivity of flake graphite is 0.02 Ω·cm or less, and is one digit smaller than the electric resistivity of about 0.1 Ω·cm of carbon blacks such as acetylene black. Therefore, flake graphite is used instead of carbon blacks used in previously existing lead acid batteries, so that the electrical resistance of the negative active material is reduced and the charge acceptance performance can be improved.

Here, the average primary particle size of flake graphite is determined in compliance with laser diffraction-scattering method described in JIS M8511 (2005), in which a laser diffraction-scattering particle size distribution analyzer (Micro Track 9220FRA made by Nikkiso Co.) is used, a proper amount of flake graphite sample is loaded in aqueous solution including 0.5 vol % of polyoxyalkylene octyl phenyl ether (Triton X-100 made by Roche Diagnostics K.K., for example) as dispersant that is commercially available surface active agent, an ultrasonic wave of 40 W is applied for 180 seconds while being stirred, and then the average particle size is measured. The value of the determined average particle size (the median diameter: D50) is the average primary particle size.

A lead acid battery mounted on a microhybrid vehicle such as an ISS vehicle and a generation control vehicle is used in partially charged state called the PSOC. In the lead acid battery used under such situations, a phenomenon called sulfation occurs in early stage in which lead sulfate, which is insulator generated on a negative active material in discharging, becomes coarse accompanied by the repetition of charging and discharging. When sulfation occurs, the charge acceptance characteristic of the negative active material and the discharge performance are considerably degraded.

The carbon conductive material added to the negative active material acts in which the carbon conductive material suppresses the formation of coarse lead sulfate, maintains lead sulfate in fine state, suppresses a reduction in the concentration of lead ions dissolved from lead sulfate, and maintains high charge acceptance characteristic.

Moreover, preferably, for organic compound that suppresses the formation of coarse negative active materials accompanied by charging and discharging, formaldehyde condensates of bisphenols and aminobenzenesulfonic acid are used. The bisphenols include bisphenol A, bisphenol F, and bisphenol S, for example. In the condensates, formaldehyde condensate of bisphenol A and aminobenzene sodium sulfonate is more preferable, which is expressed by a chemical constitutional formula in Chemical Formula 1 below.

Chemical Formula 1 where $R_1$ and $R_2$ represent respectively hydrogen or except where both of $R_1$ and $R_2$ are hydrogen.

The charging reaction of the negative active material depends on the concentration of lead ions dissolved from lead sulfate, which is discharge product, and the charge acceptance characteristic is more improved as there are a larger number of lead ions. Lignin, which is widely used as organic compound added to the negative active material in order to suppress the formation of coarse negative active materials accompanied by charging and discharging, is adsorbed on lead ions and reduces the reactivity of lead ions, and causes a side effect that inhibits the charging reaction of the negative active material and suppresses the improvement of the charge acceptance characteristic. On the contrary, formaldehyde condensate of bisphenol A and aminobenzene sodium sulfonate having the chemical constitutional formula in Chemical Formula 1 has a weak adsorption on lead ions and has a small adsorption amount. Thus, when the condensate is used instead of lignin, the occurrences of such events are reduced that the charge acceptance characteristic is hampered and that keeping the charge acceptance characteristic due to adding the carbon conductive material is hampered.

It is noted that the present invention do not hamper the selection of lignin sodium sulphonate, for example, expressed by a chemical constitutional formula in Chemical Formula 2 (a partial structure) below as organic compound that suppresses the formation of coarse negative active materials accompanied by charging and discharging.

Chemical Formula 2

In implementing the present invention, preferably, the positive active material utilization ratio of the positive plate is set to a range of 50 to 65%.

In the present description, the utilization ratio of the positive active material on the discharging reaction is defined as follows. Namely, a positive plate whose active material utilization ratio is to be determined is used to assemble a flooded-type lead acid battery in which the theoretical capacity of negative active material is sufficiently greater than the theoretical capacity of positive active material. The lead acid battery is subjected to positive electrode dominant discharge test in which the lead acid battery is fully charged, and discharged at 0.2 C current for rated capacity, and discharging reaction becomes difficult because of depleted positive active material to terminate discharging before depleting the negative active material. In the discharge test, positive active material utilization ratio is the ratio between the amount of discharge electrical quantity until termination of discharge and the theoretical discharge capacity of the positive active material of the positive plate.

More specifically, a lead acid battery was configured in which a plate group formed of a single positive plate and two negative plates (the theoretical capacity of negative active material was 1.5 times or more of the theoretical capacity of positive active material), in which the negative plates were disposed on both sides of the positive plate through a separator, the plate group was accommodated in a battery container, and electrolyte (dilute sulfuric acid having specific gravity of 1.28) was pored into the battery container in amount of electrolyte that the theoretical capacity was 1.5 times or more of the theoretical capacity of the positive active material. The lead acid battery was then subjected to discharge test in which the lead acid battery was fully charged and the lead acid battery was discharged at 0.2 C current for rated capacity. The reason why the capacity of the electrolyte and the theoretical capacity of the negative active material are 1.5 times or more of the theoretical capacity of the positive active material is that the discharging reaction is to be surely terminated under the positive electrode dominant condition.

The fact that the utilization ratio of the positive active material on the discharging reaction is high means that the state in which the spreading diffusion of a hydrogen ion ($H^+$) or a sulfuric acid ion ($SO_4^{2-}$), which are the reactive species of the discharging reaction, is quickly conducted can be maintained longer and the discharging reaction can be continued for a long time. The fact that the diffusion of the reactive species is maintained for a long time means that there are many diffusion paths for the reactive species.

In implementing the present invention, a typical polyethylene separator made of a polyethylene microporous sheet can be used for a separator. However, a polyethylene separator is not used alone. A polyethylene separator is combined with a separator of a nonwoven fabric made of a fiber material such as glass fiber, polyolefin fiber (polyethylene or polypropylene fibers, for example), or pulp (simply referred to as "a nonwoven fabric separator").

In this case, a polyethylene separator is laid on a nonwoven fabric separator in such a way that the surface of the separator opposite to the negative plate is formed of the nonwoven fabric separator. The nonwoven fabric separator can appropriately include inorganic oxide powder such as silica. A nonwoven fabric sheet can be manufactured by papermaking method dispersing fibers in water, so that inorganic oxide powder can be easily included in a nonwoven fabric sheet when the inorganic oxide powder is dispersed in the water together with the fibers before forming a sheet. Moreover, preferably, a nonwoven fabric is a mixed nonwoven fabric including glass fiber, pulp, and silica powder as principal components. For a nonwoven fabric formed of a mixture of such a plurality of types of fibers, such a nonwoven fabric can be preferably used, which is applied to a valve regulated lead acid battery disclosed in Japanese Patent Application Laid-Open Publication No. Hei-2002-260714, for example, (for a thin separator, the nonwoven fabric is not formed of glass fiber alone, and the nonwoven fabric is formed of glass fiber and acid-resistant organic resin fiber, and silica as necessary).

The nonwoven fabric separator is contacted with the entire plate surface of the negative plate, not integrated with the plate. The negative plate contacted with the nonwoven fabric is accommodated in an envelope polyethylene separator. In the accommodation, the nonwoven fabric separator is bent in a V-shape or a U-shape in such a way that the surfaces are opposite to each other, and the negative plate is disposed between the opposite surfaces.

Sulfuric acid ions generated from lead sulfate in charging are moved below in electrolyte. Since the battery is not fully charged under the PSOC, the electrolyte is not stirred due to gassing. As a result, the ununiformity of the concentration of the electrolyte occurs, which is called layer formation in which the specific gravity of the electrolyte in the lower part of the battery is increased whereas the specific gravity of the electrolyte in the upper part is reduced. Since the reaction area is reduced when such a phenomenon occurs, the charge acceptance characteristic and the discharge performance are degraded. The precipitation of sulfuric acid ions can be prevented when a highly porous separator formed of a nonwoven fabric is contacted with the surface of the negative plate, so that the occurrence of layer formation can be prevented. The mechanism is assumed as follows. It is important that the nonwoven fabric separator is contacted with the surface of the negative plate, not integrated with the plate.

Under the PSOC, the negative active material includes spongiform lead (metal lead) hardly charged with electricity and lead sulfate charged with electricity to negative as principal components. Therefore, the negative electrode is mainly charged with electricity to negative. This means that the solid phase of the negative active material (including lead sulfate) is potentially lower than the positive electrode and is located on the negative side on the battery configuration. The battery voltage originally appeasers as the sum total of the potential difference in the electric double layer region between the positive electrode and the negative electrode. The electric double layer region is a thin layer region in angstrom order. However, the battery voltage of the lead acid battery is equal to the potential difference between the potential on the positive electrode side and the potential on the negative electrode side with respect to the potential difference in the electric double layer region between the positive electrode and the negative electrode. Therefore, the solid phase of the positive active material is in the electric double layer structure in which the solid phase of the positive active material is charged at higher potential than the potential of the electrolyte, that is, the solid phase of the positive active material is positively charged. On the other hand, as described above, the solid phase of the negative active material is in the electric double layer structure in which the solid phase of the negative active material is charged at a lower potential than the potential of the electrolyte, that is, the solid phase of the negative active material is negatively charged.

Sulfuric acid ion species ($SO_4^{2-}$ and $HSO_4^-$) generated due to a charging reaction have characteristics that the sulfuric acid ion species are heavier than water in the electrolyte and tend to precipitate by gravity. As described above, since the solid phase of the negative active material is in the electric double layer structure negatively charged, the sulfuric acid ion species ($SO_4^{2-}$ and $HSO_4^-$) generated on the negative electrode side are in the relationship in which the sulfuric acid ion species are electrostatically repulsed against the negative electrode. With the application of the action of electrostatic repulsion, such an environment is provided in which the solid phase of the negative active material, that is, sulfuric acid ion species ($SO_4^{2-}$ and $HSO_4^-$) generated in the negative active material pores are pushed to the electrolyte phase side caused due to the charging reaction on the negative electrode side and the precipitation of the sulfuric acid ion species is accelerated in the electrolyte. In such an environment, the nonwoven fabric separator just only contacting the surface of the negative plate effectively suppresses the precipitation of the sulfuric acid ion species ($SO_4^{2-}$ and $HSO_4^-$) pushed from the negative active material pores to the electrolyte phase in the electrolyte, and it is possible to avoid layer formation in the electrolyte.

On the other hand, since the solid phase of the positive active material is in the electric double layer structure charged with electricity to positive, sulfuric acid ion species ($SO_4^{2-}$ and $HSO_4^-$) generated on the positive electrode side are not in the relationship in which the sulfuric acid ion species are electrostatically repulsed against the positive electrode. Therefore, even though the nonwoven fabric separator is contacted with the surface of the positive plate, the effect of avoiding layer formation in the electrolyte is small. This can be said also in both configurations in which the nonwoven fabric separator is not contacted with the surface of the negative plate and is contacted with the surface of the positive plate on the outer side of the envelope separator accommodating the negative plate and in which the nonwoven fabric separator is contacted with the surface of the positive plate in the inside of the envelope separator accommodating the positive plate.

It is important that the nonwoven fabric separator is disposed as the nonwoven fabric separator is just contacted with the surface of the negative plate in the envelope separator, not integrated with the surface of the negative plate. As disclosed in Patent Literature 1, when the glass fiber mat (corresponding to the nonwoven fabric separator according to the present invention) is integrally attached to the negative plate surface, the negative active material enters the gaps between fibers configuring the nonwoven fabric to form layers in which the fibers are mixed with the negative active material. These layers are rather the solid phase of the negative active material in which sulfuric acid ion species are generated in the negative active material pores due to the charging reaction. Namely, the nonwoven fabric integrally attached to the negative plate surface is a part of the solid phase of the negative active material in which sulfuric acid ion species are generated in the negative active material pores and are the causes of layer formation. Therefore, it is difficult, for the nonwoven fabric that is a part of the solid phase of the negative active material, to suppress the phenomenon of layer formation appearing due to the precipitation of sulfuric acid ion species that are generated in the negative active material pores and pushed to the electrolyte phase side. Moreover, the nonwoven fabric integrally attached to the negative plate surface also causes the battery to increase internal resistance.

The configuration in which the nonwoven fabric separator is used as bent in a V-shape or a U-shape in such a way that the surfaces are opposite to each other is more excellent than the case where a nonwoven fabric separator is individually disposed on both sides of the negative plate in the respect that the positions of the negative plate and the nonwoven fabric separator are not shifted.

Moreover, in the flooded-type lead acid battery, the plates are arrayed in such a way that the plate surface is in the vertical direction, so that the plate surface tends to extend vertically when the plate extends. Under the PSOC, lead sulfate tends to accumulate on the negative electrode, and lead sulfate often tends to remain in the lower part of the negative plate in the vertical direction particularly. When lead sulfate accumulates, the volume of lead sulfate expands 2.7 times the volume of spongiform lead which is a negative active material, and the lower part of the negative plate tends to extend below. The nonwoven fabric separator is used as bent in a V-shape or a U-shape in such a way that the surfaces are opposite to each other, so that the lower part of the negative plate is positioned on the bent portion of the nonwoven fabric separator, and thus it can be prevented that the deformed lower part of the negative plate breaks through the envelope separator to cause short circuit.

EXAMPLES

Figure 2:
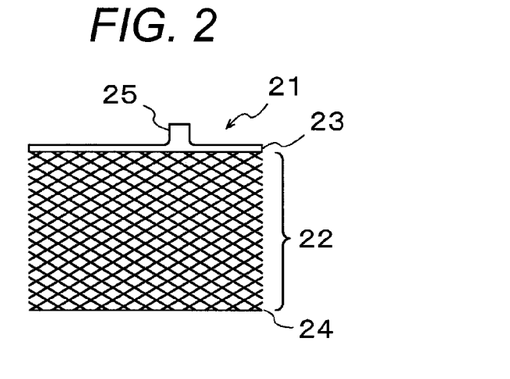
FIG. 2 is an illustration of an expanded current collector for use in an example of a lead acid battery according to the present invention.

First, an unformed positive plate was prepared. Mixture of lead oxide, red lead, and cut fiber (polyethylene terephthalate short fiber, which is also used as a phrase "cut fiber" below) was kneaded with water. Subsequently, the mixture was kneaded while adding dilute sulfuric acid drop by drop, and a positive electrode active material paste was manufactured. This active material paste is filled in an expanded current collector 21 illustrated in FIG. 2 prepared by expanding a rolled sheet formed of lead alloy. The expanded current collector 21 is configured of a grid portion 22, an upper frame 23, a lower frame 24, and a lug 25. After filling the active material paste, the paste was aged for 24 hours in an atmosphere at a temperature of 40° C. at a humidity of 95%, and then dried, and an unformed positive plate was prepared.

Here, positive plates having positive active materials different in utilization ratios on a discharging reaction were prepared as below. Namely, when the adding of dilute sulfuric acid is increased in preparing positive active material paste, the porosity of active material is increased and the utilization ratio of the positive active material on the discharging reaction is improved. Because of the fact, unformed positive plates were prepared by appropriately changing the adding of dilute sulfuric acid in terms of quantity, and positive plates different in active material utilization ratios on the discharging reaction were obtained.

Next, an unformed negative plate was prepared. Mixture of lead oxide, cut fiber, barium sulfate, some carbon conductive material, and some organic compound that suppresses the formation of coarse negative active materials was kneaded with water. Subsequently, the mixture was kneaded while adding dilute sulfuric acid drop by drop, and a negative electrode active material paste was prepared. This active material paste was filled in an expanded current collector prepared by expanding a rolled sheet formed of lead alloy, the paste was aged for 24 hours in an atmosphere at a temperature of 40° C. at a humidity of 95%, and then dried, and an unformed negative plate was prepared. Here, negative plates A, B, and C shown below were prepared as organic compounds that suppress the formation of coarse negative active materials and carbon conductive materials were varied.

Negative Plate A

For organic compound that suppresses the formation of coarse negative active materials, organic compound including lignin sodium sulphonate expressed in Chemical Formula 2 as a principal component was selected. For carbon conductive material, carbon black (specific surface area of 260 $m^2/g$) made from raw heavy oil was used. The quantity of addition of the carbon conductive material was 0.2 parts by mass with respect to 100 parts by mass of the active material. Here, 100 parts by mass of the active material means 100 parts by mass of the active material (spongiform metal lead) in the fully charged state. The same thing is applied below.

Negative Plate B

For organic compound that suppresses the formation of coarse negative active materials, organic compound including formaldehyde condensate of bisphenol A and aminobenzene sodium sulfonate expressed in Chemical Formula 1 (molecular weight ranging from 17,000 to 20,000 and sulfur content in the compound was 6 to 11 percent by mass) as a principal component was selected. For carbon conductive material, the carbon black described above was used. The quantity of addition of the carbon conductive material was 0.2 parts by mass with respect to 100 parts by mass of the active material.

Negative plate C

For organic compound that suppresses the formation of coarse negative active materials, organic compound including formaldehyde condensate of bisphenol A and aminobenzene sodium sulfonate expressed in Chemical Formula 1 (a molecular weight ranging from 17,000 to 20,000 and a sulfur content in the compound was 6 to 11 percent by mass) as a principal component was selected. For carbon conductive material, flake graphite (particle size of 180 μm) was used. The quantity of addition of the carbon conductive material was 2 parts by mass with respect to 100 parts by mass of the active material.

Next, the negative plates A, B, and C, positive plates having various utilization ratios of the positive active materials on the discharging reaction, and one or two types of separators were combined.

Figure 1:
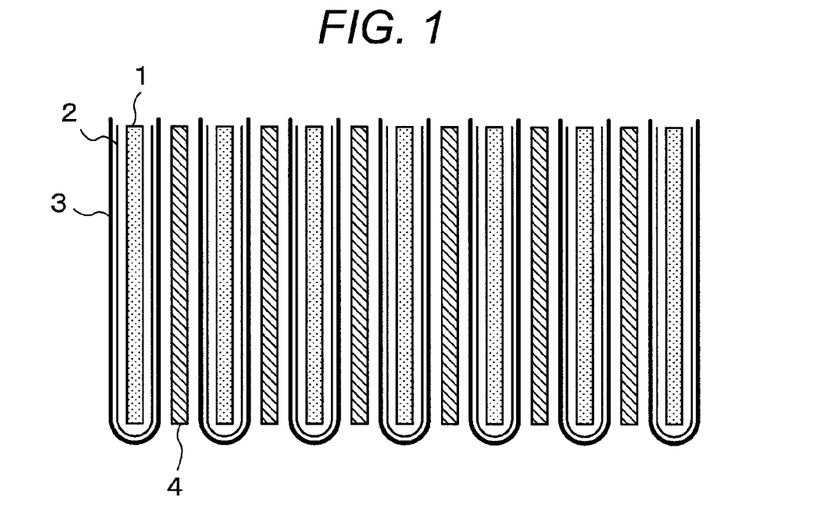
FIG. 1 is a cross sectional illustration of the configuration of a plate group in an example of a lead acid battery according to the present invention.

FIG. 1 is a cross sectional view of a plate group in which positive and negative plates and separators are stacked on each other. First, a polyethylene separator in predetermined dimensions and length (projecting rib height of 0.6 mm, base thickness of 0.2 mm, the total thickness of 0.8 mm, and drawing of the projecting ribs is omitted in FIG. 1) and a glass fiber nonwoven fabric 2 (thickness of 0.3 mm) are laid on each other. In this state, a crease is put in the crosswise direction in the center of the length direction, the polyethylene separator is bent in a U-shape, and a negative plate 1 is disposed on the inner side of the U-shape. Both sides of the polyethylene separator bent in a U-shape are sealed in the length direction, and a polyethylene envelope separator 3 is formed.

The negative plate 1 accommodated in the polyethylene envelope separator 3 and a positive plate 4 are alternately stacked on each other, including six positive plates and seven negative plates.

Figure 3:
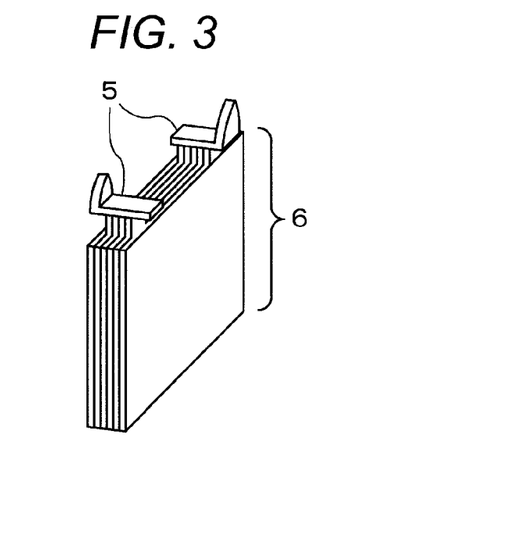
FIG. 3 is an illustration of a plate group for use in an example of a lead acid battery according to the present invention.

Subsequently, lugs 25 on the same polarity plates were welded by a Cast On Strap (COS) method to form a strap 5, and a plate group 6 in FIG. 3 was prepared. The plate group 6 is inserted into a battery container in the subsequent step, and a cover is hot-welded to the battery container. The assembled battery is a D23 type lead acid battery defined in JIS D5301.

Here, for the separator, a separator P was a separator using an envelope polyethylene separator alone. A separator Q1 was a separator having a structure in which a glass fiber nonwoven fabric was contacted with the negative plate surface inside the envelope polyethylene separator. A separator Q1' was a separator having a structure in which a glass fiber nonwoven fabric was contacted with the positive plate surface inside the envelope polyethylene separator.

In the example, a nonwoven fabric made of 100% glass fiber was used for the nonwoven fabric forming the separators Q1 and Q1'. Instead of the glass fiber nonwoven fabric, a nonwoven fabric made of a fiber material such as polyolefin or pulp, for example, may be used. A mixed nonwoven fabric including a mixture of these fiber materials as a principal component may be used. In such mixed nonwoven fabrics, a separator Q2 was in a configuration using a mixed nonwoven fabric including glass fiber, pulp, and inorganic oxide powder as principal components. More specifically, this mixed nonwoven fabric was formed by papermaking method dispersing 10 percent by mass of glass fiber, 35 percent by mass of synthetic pulp, and 55 percent by mass of silica powder in water.

Next, formation was operated in a battery container as bellow. Dilute sulfuric acid having a specific gravity of 1.230 converted at a temperature of 25° C. was poured into the battery container. An electrical charge of 200% of a theoretical capacity based on the amount of the active material was charged for formation, and then the lead acid battery was completed.

The configurations of plate groups prepared in the examples are 12 types in Table 1. Here, such positive plates were used in which active material utilization ratios on the discharging reaction were changed in four stages from 50% to 65% according to the peroration method described above. Moreover, as described above, the separator P is a separator in which the envelope polyethylene separator is used alone and various negative plates are accommodated in the separator. The separator Q1 is a separator in which the glass fiber nonwoven fabric is laid on the inner side of the envelope polyethylene separator and bent in a U-shape and various negative plates are accommodated in the U-shape. The separator Q1' is a separator in which the glass fiber nonwoven fabric is laid on the inner side of the envelope polyethylene separator and bent in a U-shape and the positive plate is accommodated in the U-shape. The separator Q2 uses the mixed nonwoven fabric instead of the glass fiber nonwoven fabric in the configuration similar to the separator Q1.

TABLE 1

| Type | Negative Plate Type | Separator Type |
|---|---|---|
| 1 | A | P |
| 2 | A | Q1 |
| 3 | A | Q1' |
| 4 | A | Q2 |
| 5 | B | P |
| 6 | B | Q1 |
| 7 | B | Q1' |
| 8 | B | Q2 |
| 9 | C | P |
| 10 | C | Q1 |
| 11 | C | Q1' |
| 12 | C | Q2 |

It is noted that in the examples, the measurement of the positive active material utilization ratio on the discharging reaction was conducted according to the foregoing method. Namely, a lead acid battery was configured in which a plate group formed of a single positive plate and two negative plates (the theoretical capacity of the negative active material is 1.5 times or more of the theoretical capacity of the positive active material), in which the negative plates were disposed on both sides of the single positive plate through a separator was accommodated in the battery container, and electrolyte (dilute sulfuric acid having specific gravity of 1.28) was poured in the battery container in amount that the theoretical capacity was 1.5 times or more of the theoretical capacity of the positive active material, and then the lead acid battery was subjected to a positive electrode dominant discharge test in which the lead acid battery was fully charged, and discharged at 0.2 C current for rated capacity, and a discharging reaction became difficult because of a depleted positive active material to terminate discharging before depleting the negative active material. In the discharge test, the positive active material utilization ratio was the ratio between the amount of discharge electrical quantity until termination of discharge and the theoretical discharge capacity of the positive active material of the positive plate.

The measurement of the charge acceptance characteristic and the measurement of the cycle characteristics (a life test) were conducted on lead acid batteries assembled using plate groups from types 1 to 12.

First, the measurement of the charge acceptance characteristic was conducted as follows. The SOC (the state of charge) of the lead acid battery in the initial state of the assembly was adjusted at 90% of a fully charged state in a thermostatic chamber at a temperature of 25° C., and a charging current value at the fifth second was measured (a fifth second charging current value) after starting the application of a charging voltage of 14 V (where an electric current before reaching a voltage of 14 V was limited to a current of 100 A). A higher fifth second charging current value means a higher initial charge acceptance characteristic.

Moreover, a cycle test was repeated for 5,000 cycles in which a single cycle was formed of ten minute charging at a charging voltage of 14.8 V (where an electric current before reaching a voltage of 14.8 V was limited to a current of 25 A) and four minute discharging at a constant current of 25 A in a thermostatic chamber at a temperature of 40° C., and then the measurement of the charge acceptance characteristic was conducted under the conditions as similar to the initial conditions. Namely, a higher fifth second charging current value after 5,000 cycles means that the excellent charge acceptance characteristic in the initial state is maintained after the test.

The measurement of the cycle characteristics was conducted as follows. A life test was conducted in which the atmosphere temperature was adjusted in such a way that the battery temperature was at a temperature of 25° C., the lead acid battery was discharged at a constant current of 45 A for 59 seconds and a constant current of 300 A for one second, and then the lead acid battery was charged at a constant current of 100 A at a constant voltage of 14 V for 60 seconds, which were a single cycle.

This test is a cycle test that simulates the use of the lead acid battery in the ISS vehicle. In the life test, since the charge amount is smaller than the discharge amount, the lead acid battery is gradually in a poorly charged state when the lead acid battery is not fully charged. As a result, the first second voltage is gradually reduced when the lead acid battery is discharged for one second at a discharge current of 300 A. Namely, when the negative electrode is polarized in a constant current constant voltage charge and charging is then switched to a constant voltage charge in an early stage, the charge current is attenuated to cause a poorly charged state. In the life test, it was determined that the end of the life of a battery was reached when the first second voltage in discharging at a current of 300 A was below a voltage of 7.2 V.

A poorly charged state is continued and the cycle characteristics are degraded unless a high charge acceptance characteristic is maintained during the charging and discharging cycle as well. A change in association with the charging and discharging cycle for the fifth second charging current value and the cycle characteristics are evaluated, so that the quality of the charge acceptance characteristic during the charging and discharging cycle can be properly evaluated.

Moreover, in the test, the specific gravity value of the electrolyte converted at a temperature of 20° C., was measured near the electrolyte surface in the upper part of the battery container and on the bottom part of the battery container, and a difference in the specific gravity of the electrolyte between the vicinity of the electrolyte surface and the bottom part of the battery container was calculated. A smaller difference means that the degree of layer formation in the electrolyte in the cycle is lower. In the test, the difference in the specific gravity of the electrolyte after 1,000 cycles was checked, and set to a scale for the degree of layer formation.

According to the tests, the charge acceptance characteristic in a constant voltage charge and the durability when used under the PSOC can be evaluated.

The measured result of the fifth second charge current conducted on the lead acid batteries from types 1 to 12, the measured result of the cycle characteristics, and the difference in the specific gravity of the electrolyte were shown on Table 2 to Table 13. Table 3, Table 5, Table 7, Table 9, Table 11, and Table 13 show examples, and Table 2, Table 4, Table 6, Table 8, Table 10, and Table 12 show comparative examples.

It is noted that No. 1 in Table 2 is the plate group configuration (the reference example) that is a reference to the evaluation of Tables. The reference example is the case where the utilization ratio of the positive active material on the discharging reaction was 48%, and the fifth second charge current and the cycle characteristics shown in Tables were compared and evaluated on the basis of the reference example which index was set to 100. The fifth second charge current after 5,000 cycles was compared and evaluated on the basis of the initial state of the reference example which index was set to 100.

TABLE 2

| No | Positive Electrode Utilization Ratio | Negative Electrode Type | Separator Type | Fifth Second Charge Current Initial State | Fifth Second Charge Current After 5,000 Cycles | Cycle Characteristics | Electrolyte Specific Gravity Difference | Remarks |
|----|---|---|---|---|---|---|---|---|
| 1 | 48% | A | P | 100 | 50 | 100 | 0.15 | Reference |
| 2 | 50% | | | 102 | 51 | 110 | 0.15 | Example |
| 3 | 55% | | | 102 | 52 | 114 | 0.14 | Comparative |
| 4 | 60% | | | 103 | 52 | 114 | 0.14 | Examples |
| 5 | 65% | | | 103 | 53 | 114 | 0.14 | |

TABLE 3

| No | Positive Electrode Utilization Ratio | Negative Electrode Type | Separator Type | Fifth Second Charge Current Initial State | Fifth Second Charge Current After 5,000 Cycles | Cycle Characteristics | Electrolyte Specific Gravity Difference | Remarks |
|----|---|---|---|---|---|---|---|---|
| 1 | 50% | A | Q1 | 97 | 62 | 140 | 0.11 | Examples |
| 2 | 55% | | | 98 | 63 | 144 | 0.11 | |
| 3 | 60% | | | 99 | 65 | 144 | 0.11 | |
| 4 | 65% | | | 99 | 65 | 144 | 0.11 | |

TABLE 4

| No | Positive Electrode Utilization Ratio | Negative Electrode Type | Separator Type | Initial State | Fifth Second Charge Current After 5,000 Cycles | Cycle Characteristics | Electrolyte Specific Gravity Difference | Remarks |
|---|---|---|---|---|---|---|---|---|
| 1 | 50% | A | Q1' | 88 | 56 | 127 | 0.12 | Comparative Examples |
| 2 | 55% | | | 89 | 57 | 131 | 0.12 | |
| 3 | 60% | | | 90 | 59 | 131 | 0.12 | |
| 4 | 65% | | | 90 | 59 | 131 | 0.12 | |

TABLE 5

| No | Positive Electrode Utilization Ratio | Negative Electrode Type | Separator Type | Initial State | Fifth Second Charge Current After 5,000 Cycles | Cycle Characteristics | Electrolyte Specific Gravity Difference | Remarks |
|---|---|---|---|---|---|---|---|---|
| 1 | 50% | A | Q2 | 99 | 68 | 154 | 0.05 | Examples |
| 2 | 55% | | | 100 | 69 | 158 | 0.05 | |
| 3 | 60% | | | 101 | 72 | 158 | 0.04 | |
| 4 | 65% | | | 101 | 72 | 158 | 0.04 | |

Table 2 to Table 5 show that the difference occurs concerning the fifth second charge current (the charge acceptance characteristic), the cycle characteristics (the lifetime performance under the PSOC), and the difference in the specific gravity of the electrolyte (the degree of layer formation in the electrolyte) due to the difference between the separator types P, Q1, Q1', and Q2 when using the negative plate A.

From the result above, it is revealed from the examples (Table 3 and Table 5) according to the present invention that in a flooded-type lead acid battery that is highly efficiently discharged to a load under the PSOC and is intermittently charged although the initial charge acceptance characteristic is slightly poor, the charge acceptance characteristic is maintained for a long time and the lifetime is long, and the effect of suppressing layer formation in the electrolyte is noticeable particularly using the separator type Q2.

TABLE 6

| No | Positive Electrode Utilization Ratio | Negative Electrode Type | Separator Type | Initial State | Fifth Second Charge Current After 5,000 Cycles | Cycle Characteristics | Electrolyte Specific Gravity Difference | Remarks |
|---|---|---|---|---|---|---|---|---|
| 1 | 50% | B | P | 171 | 102 | 194 | 0.12 | Comparative Examples |
| 2 | 55% | | | 179 | 106 | 199 | 0.11 | |
| 3 | 60% | | | 191 | 111 | 202 | 0.10 | |
| 4 | 65% | | | 197 | 112 | 204 | 0.10 | |

TABLE 7

| No | Positive Electrode Utilization Ratio | Negative Electrode Type | Separator Type | Initial State | Fifth Second Charge Current After 5,000 Cycles | Cycle Characteristics | Electrolyte Specific Gravity Difference | Remarks |
|---|---|---|---|---|---|---|---|---|
| 1 | 50% | B | Q1 | 164 | 119 | 294 | 0.08 | Examples |
| 2 | 55% | | | 174 | 125 | 299 | 0.08 | |
| 3 | 60% | | | 187 | 130 | 303 | 0.08 | |
| 4 | 65% | | | 192 | 139 | 306 | 0.08 | |

TABLE 8

| No | Positive Electrode Utilization Ratio | Negative Electrode Type | Separator Type | Fifth Second Charge Current Initial State | Fifth Second Charge Current After 5,000 Cycles | Cycle Characteristics | Electrolyte Specific Gravity Difference | Remarks |
|---|---|---|---|---|---|---|---|---|
| 1 | 50% | B | Q1' | 149 | 108 | 267 | 0.09 | Comparative Examples |
| 2 | 55% | | | 158 | 114 | 272 | 0.09 | |
| 3 | 60% | | | 170 | 118 | 275 | 0.09 | |
| 4 | 65% | | | 175 | 126 | 278 | 0.09 | |

TABLE 9

| No | Positive Electrode Utilization Ratio | Negative Electrode Type | Separator Type | Fifth Second Charge Current Initial State | Fifth Second Charge Current After 5,000 Cycles | Cycle Characteristics | Electrolyte Specific Gravity Difference | Remarks |
|---|---|---|---|---|---|---|---|---|
| 1 | 50% | B | Q2 | 167 | 131 | 323 | 0.04 | Examples |
| 2 | 55% | | | 177 | 138 | 329 | 0.04 | |
| 3 | 60% | | | 191 | 143 | 333 | 0.03 | |
| 4 | 65% | | | 196 | 153 | 337 | 0.03 | |

Table 6 to Table 9 show that the difference occurs concerning the fifth second charge current (the charge acceptance characteristic), the cycle characteristics (the lifetime performance under the PSOC), and the difference in the specific gravity of the electrolyte (the degree of layer formation in the electrolyte) due to the difference between the separator types P, Q1, Q1', and Q2 when using the negative plate B.

Also from the result above, it is revealed from the examples (Table 7 and Table 9) according to the present invention that in a flooded-type lead acid battery that is highly efficiently discharged to a load under the PSOC and is intermittently charged although the initial charge acceptance characteristic is slightly poor, the charge acceptance characteristic is maintained for a long time and the lifetime is long, and the effect of suppressing layer formation in the electrolyte is noticeable particularly using the separator type Q2.

Moreover, from the comparison between Table 3 and Table 7, it is revealed that when organic compound including the condensate in Chemical Formula 1 as a principal component is used for organic compound that suppresses the formation of coarse negative active materials, the fifth second charge current (the charge acceptance characteristic) and the cycle characteristics (the lifetime performance under the PSOC) can be greatly improved.

TABLE 10

| No | Positive Electrode Utilization Ratio | Negative Electrode Type | Separator Type | Fifth Second Charge Current Initial State | Fifth Second Charge Current After 5,000 Cycles | Cycle Characteristics | Electrolyte Specific Gravity Difference | Remarks |
|---|---|---|---|---|---|---|---|---|
| 1 | 50% | C | P | 170 | 104 | 243 | 0.09 | Comparative Examples |
| 2 | 55% | | | 180 | 115 | 252 | 0.08 | |
| 3 | 60% | | | 189 | 124 | 267 | 0.08 | |
| 4 | 65% | | | 203 | 126 | 271 | 0.08 | |

TABLE 11

| No | Positive Electrode Utilization Ratio | Negative Electrode Type | Separator Type | Fifth Second Charge Current Initial State | Fifth Second Charge Current After 5,000 Cycles | Cycle Characteristics | Electrolyte Specific Gravity Difference | Remarks |
|---|---|---|---|---|---|---|---|---|
| 1 | 50% | C | Q1 | 165 | 124 | 305 | 0.07 | Examples |
| 2 | 55% | | | 175 | 135 | 313 | 0.07 | |
| 3 | 60% | | | 184 | 144 | 327 | 0.06 | |
| 4 | 65% | | | 198 | 154 | 331 | 0.06 | |

TABLE 12

| No | Positive Electrode Utilization Ratio | Negative Electrode Type | Separator Type | Fifth Second Charge Current Initial State | Fifth Second Charge Current After 5,000 Cycles | Cycle Characteristics | Electrolyte Specific Gravity Difference | Remarks |
|---|---|---|---|---|---|---|---|---|
| 1 | 50% | C | Q1' | 150 | 113 | 277 | 0.07 | Comparative |
| 2 | 55% |   |   | 159 | 123 | 285 | 0.07 | tive |
| 3 | 60% |   |   | 167 | 131 | 297 | 0.07 | Examples |
| 4 | 65% |   |   | 180 | 140 | 301 | 0.07 |   |

TABLE 13

| No | Positive Electrode Utilization Ratio | Negative Electrode Type | Separator Type | Fifth Second Charge Current Initial State | Fifth Second Charge Current After 5,000 Cycles | Cycle Characteristics | Electrolyte Specific Gravity Difference | Remarks |
|---|---|---|---|---|---|---|---|---|
| 1 | 50% | C | Q2 | 168 | 136 | 336 | 0.03 | Examples |
| 2 | 55% |   |   | 179 | 149 | 344 | 0.03 |   |
| 3 | 60% |   |   | 188 | 158 | 360 | 0.02 |   |
| 4 | 65% |   |   | 202 | 169 | 364 | 0.02 |   |

Table 10 to Table 13 show that the difference occurs concerning the fifth second charge current (the charge acceptance characteristic), the cycle characteristics (the lifetime performance under the PSOC), and the difference in the specific gravity of the electrolyte (the degree of layer formation in the electrolyte) due to the difference between the separator types P, Q1, Q1', and Q2 when using the negative plate C.

Also from the result above, it is revealed from the examples (Table 11 and Table 13) according to the present invention that in a flooded-type lead acid battery that is highly efficiently discharged to a load under the PSOC and is intermittently charged although the initial charge acceptance characteristic is slightly poor, the charge acceptance characteristic is maintained for a long time and the lifetime is long, and the effect of suppressing layer formation in the electrolyte is noticeable particularly using the separator type Q2.

Furthermore, from the comparison between Table 7 and Table 11, it is revealed that although there is not much difference in the initial fifth second charge current between the case where flake graphite is added (Table 11) and the case where carbon black is added (Table 7), in the case where flake graphite is added, the fifth second charge current and the cycle characteristics after 5,000 cycles can be improved, and the effect of suppressing layer formation in the electrolyte is great as well.

Since the characteristic of flake graphite is in that the physical properties of the active material paste are not changed (the paste is not hardened) when its addition is increased, the quantity of addition of flake graphite can be increased.

Next, the influence was confirmed that the average primary particle size affected the battery characteristics on type No. 3 lead acid batteries in Table 10 to Table 13 by changing the average primary particle size of flake graphite.

Similarly, the evaluated results of the fifth second charge current and the cycle characteristics are shown in Table 11 to Table 13. The fifth second charge current and the cycle characteristics shown in Tables were similarly evaluated on the basis of the reference example in Table 1 which index was set to 100.

TABLE 14

| No | Positive Electrode Utilization Ratio | Negative Electrode Type | Separator Type | Graphite Average Primary Particle Size (um) | Fifth Second Charge Current Initial State | Fifth Second Charge Current After 5,000 Cycles | Cycle Characteristics | Electrolyte Specific Gravity Difference | Remarks |
|---|---|---|---|---|---|---|---|---|---|
| 1 | 60% | C | P | 80 | 158 | 57 | 121 | 0.09 | Comparative |
| 2 |   |   |   | 100 | 169 | 79 | 194 | 0.08 | tive |
| 3 |   |   |   | 120 | 174 | 90 | 212 | 0.08 | Examples |
| 4 |   |   |   | 140 | 179 | 102 | 230 | 0.08 |   |
| 5 |   |   |   | 180 | 189 | 124 | 267 | 0.08 |   |
| 6 |   |   |   | 220 | 189 | 124 | 267 | 0.08 |   |

TABLE 15

| No | Positive Electrode Utilization Ratio | Negative Electrode Type | Separator Type | Graphite Average Primary Particle Size (um) | Fifth Second Charge Current Initial State | Fifth Second Charge Current After 5,000 Cycles | Cycle Characteristics | Electrolyte Specific Gravity Difference | Remarks |
|---|---|---|---|---|---|---|---|---|---|
| 1 | 60% | C | Q1 | 80 | 156 | 74 | 181 | 0.07 | Examples |
| 2 | | | | 100 | 164 | 99 | 254 | 0.06 | |
| 3 | | | | 120 | 169 | 110 | 272 | 0.06 | |
| 4 | | | | 140 | 174 | 122 | 291 | 0.06 | |
| 5 | | | | 180 | 184 | 144 | 327 | 0.06 | |
| 6 | | | | 220 | 184 | 144 | 327 | 0.06 | |

TABLE 16

| No | Positive Electrode Utilization Ratio | Negative Electrode Type | Separator Type | Graphite Average Primary Particle Size (um) | Fifth Second Charge Current Initial State | Fifth Second Charge Current After 5,000 Cycles | Cycle Characteristics | Electrolyte Specific Gravity Difference | Remarks |
|---|---|---|---|---|---|---|---|---|---|
| 1 | 60% | C | Q1' | 80 | 142 | 67 | 165 | 0.08 | Comparative Examples |
| 2 | | | | 100 | 149 | 90 | 231 | 0.07 | |
| 3 | | | | 120 | 154 | 100 | 247 | 0.07 | |
| 4 | | | | 140 | 158 | 111 | 265 | 0.07 | |
| 5 | | | | 180 | 167 | 131 | 297 | 0.07 | |
| 6 | | | | 220 | 167 | 131 | 297 | 0.07 | |

TABLE 17

| No | Positive Electrode Utilization Ratio | Negative Electrode Type | Separator Type | Graphite Average Primary Particle Size (um) | Fifth Second Charge Current Initial State | Fifth Second Charge Current After 5,000 Cycles | Cycle Characteristics | Electrolyte Specific Gravity Difference | Remarks |
|---|---|---|---|---|---|---|---|---|---|
| 1 | 60% | C | Q2 | 80 | 159 | 81 | 199 | 0.03 | Examples |
| 2 | | | | 100 | 167 | 109 | 279 | 0.02 | |
| 3 | | | | 120 | 172 | 121 | 299 | 0.02 | |
| 4 | | | | 140 | 177 | 134 | 320 | 0.02 | |
| 5 | | | | 180 | 188 | 158 | 360 | 0.02 | |
| 6 | | | | 220 | 188 | 158 | 360 | 0.02 | |

Table 14 to Table 17 show that the difference occurs concerning the fifth second charge current (the charge acceptance characteristic), the cycle characteristics (the lifetime performance under the PSOC), and the difference in the specific gravity of the electrolyte (the degree of layer formation in the electrolyte) due to the difference between the separator types P, Q1, Q1', and Q2 in each case of the primary particle size of flake graphite.

Also from the result above, it is revealed from the examples (Table 15 and Table 17) according to the present invention that in a flooded-type lead acid battery that is highly efficiently discharged to a load under the PSOC and is intermittently charged although the initial charge acceptance characteristic is equivalent to the other examples, the charge acceptance characteristic is maintained for a long time and the lifetime is long, and the effect of suppressing layer formation in the electrolyte is noticeable particularly using the separator type Q2.

In addition, from the results shown in Table 15 and Table 17, it is noticeable that the charge acceptance characteristic is maintained for a long time and the lifetime is long in the range in which the average primary particle size of flake graphite is 100 μm or more.

In the present invention, in the configuration in which the negative plate is accommodated in the envelope separator formed of a microporous synthetic resin sheet, the negative plate is contacted with, throughout the plate surface, a nonwoven fabric formed of at least one fiber material selected from a material group consisting of glass, pulp, and polyolefin, not integrated with the plate, so that the charge acceptance characteristic of the lead acid battery can be maintained for a long time under the PSOC, and the lifetime performance can be improved. This is a great progress for the lead acid battery when used under the PSOC, and this greatly contributes to improving the performance of the lead acid battery mounted on a micro hybrid vehicle, for example.

Moreover, the present invention is widely applicable to flooded-type lead acid batteries, not limited to automobile lead acid batteries described in the foregoing examples, and the present invention includes general flooded-type lead acid batteries. For example, it is assumed that an electric motor car such as a fork lift truck is used under the PSOC before a lead acid battery mounted on the fork lift truck is fully charged when the fork lift truck is operated for a long time. The present invention is also preferable to this case.

REFERENCE SIGNS LIST

1 Negative plate
2 Nonwoven fabric
3 Envelope separator
4 Positive plate
5 Strap
6 Plate group
21 Expand current collector
22 Grid portion
23 Upper frame
24 Lower frame
25 Lug

The invention claimed is:
1. A flooded-type lead acid battery comprising:
a plate group including:
a negative plate having negative active material filled in a negative electrode current collector; and
a positive plate having positive active material filled in a positive electrode current collector,
the negative plate and the positive plate being stacked on each other through a separator and accommodated in a battery container together with an electrolyte, the flooded-type lead acid battery being discharged to a load in partially charged state,
wherein, during use under a partial state of charge, the negative plate is contacted with, throughout a plate surface, a nonwoven fabric formed of at least one fiber material selected from a material group consisting of glass, pulp, and polyolefin, not integrated with the plate, and
the negative plate contacted with the nonwoven fabric is accommodated in an envelope separator formed of a microporous synthetic resin sheet.
2. The lead acid battery according to claim 1, wherein the nonwoven fabric is a mixed nonwoven fabric including glass fiber, pulp, and inorganic oxide powder as a principal component.
3. The lead acid battery according to claim 2, wherein the inorganic oxide powder is silica powder.
4. The lead acid battery according to claim 1,
wherein the nonwoven fabric is bent so that surfaces are opposite to each other, and
the negative plate is disposed between the surfaces opposite to each other.
5. The lead acid battery according to claim 1,
wherein the negative active material includes a bisphenol A-aminobenzene sodium sulfonate-formaldehyde condensate expressed in a chemical constitutional formula in Chemical Formula 1 as an organic compound that suppresses formation of coarse negative active materials in association with charging and discharging:

Chemical Formula 1 where $R_1$ and $R_2$ are hydrogen or except where both of $R_1$ and $R_2$ are hydrogen.
6. The lead acid battery according to claim 5, wherein the negative active material includes a flake graphite having an average primary particle size of 100 μm or more for the carbon conductive material.
7. The lead acid battery according to claim 5, wherein a positive active material utilization ratio ranges from 50 to 65%.
8. The lead acid battery according to claim 2,
wherein the nonwoven fabric is bent so that surfaces are opposite to each other, and
the negative plate is disposed between the surfaces opposite to each other.
9. The lead acid battery according to claim 3,
wherein the nonwoven fabric is bent so that surfaces are opposite to each other, and
the negative plate is disposed between the surfaces opposite to each other.
10. The lead acid battery according to claim 2,
wherein the negative active material includes a bisphenol A-aminobenzene sodium sulfonate-formaldehyde condensate expressed in a chemical constitutional formula in Chemical Formula 1 as an organic compound that suppresses formation of coarse negative active materials in association with charging and discharging:

Chemical Formula 1 where $R_1$ and $R_2$ are hydrogen or except where both of $R_1$ and $R_2$ are hydrogen.

11. A flooded-type lead acid comprising:
a plate group including:
a negative plate having negative active material filled in a negative electrode current collector; and
a positive plate having positive active material filled in a positive electrode current collector,
the negative plate and the positive plate being stacked on each other through a separator and accommodated in a battery container together with an electrolyte, the flooded-type lead acid battery being discharged to a load in partially charged state,
wherein, of the negative plate and the positive plate, only the negative plate is contacted with, throughout a plate surface, a nonwoven fabric formed of at least one fiber material selected from a material group consisting of glass, pulp, and polyolefin, not integrated with the plate,
the negative plate contacted with the nonwoven fabric is accommodated in an envelop separator formed of a microporous synthetic resin sheet,
the nonwoven fabric is bent so that surfaces are opposite to each other, and
the negative plate is disposed between the surfaces opposite to each other.

12. A flooded-type lead acid battery comprising:
a plate group including:
a negative plate having negative active material filled in a negative electrode current collector, wherein the negative active material includes formaldehyde condesates of bishenols and aminobenzenesulfonic acid; and
a positive plate having positive active material filled in a positive electrode current collector,
the negative plate and the positive plate being stacked on each other through a separator and accommodated in a battery container together with an electrolyte, the flooded-type lead acid battery being discharged to a load in partially charged state,
wherein, of the negative plate and the positive plate, only the negative plate is contacted with, throughout a plate surface, a nonwoven fabric formed of at least one fiber material selected from a material group consisting of glass, pulp, and polyolefin, not integrated with the plate, and
the negative plate contacted with the nonwoven fabric is accommodated in an envelop separator formed of a microporous synthetic resin sheet.

13. A flooded-type lead acid battery comprising:
a plate group including:
a negative plate having negative active material filled in a negative electrode current collector, wherein the negative active material includes lignin sodium sulfonate; and
a positive plate having positive active material filled in a positive electrode current collector,
the negative plate and the positive plate being stacked on each other through a separator and accommodated in a battery container together with an electrolyte, the flooded-type lead acid battery being discharged to a load in partially charged state,
wherein, of the negative plate and the positive plate, only the negative plate is contacted with, throughout a plate surface, a nonwoven fabric formed of at least one fiber material selected from a material group consisting of glass, pulp, and polyolefin, not integrated with the plate, and
the negative plate contacted with the nonwoven fabric is accommodated in an envelop separator formed of a microporous synthetic resin sheet.

* * * * *